Figure 1:
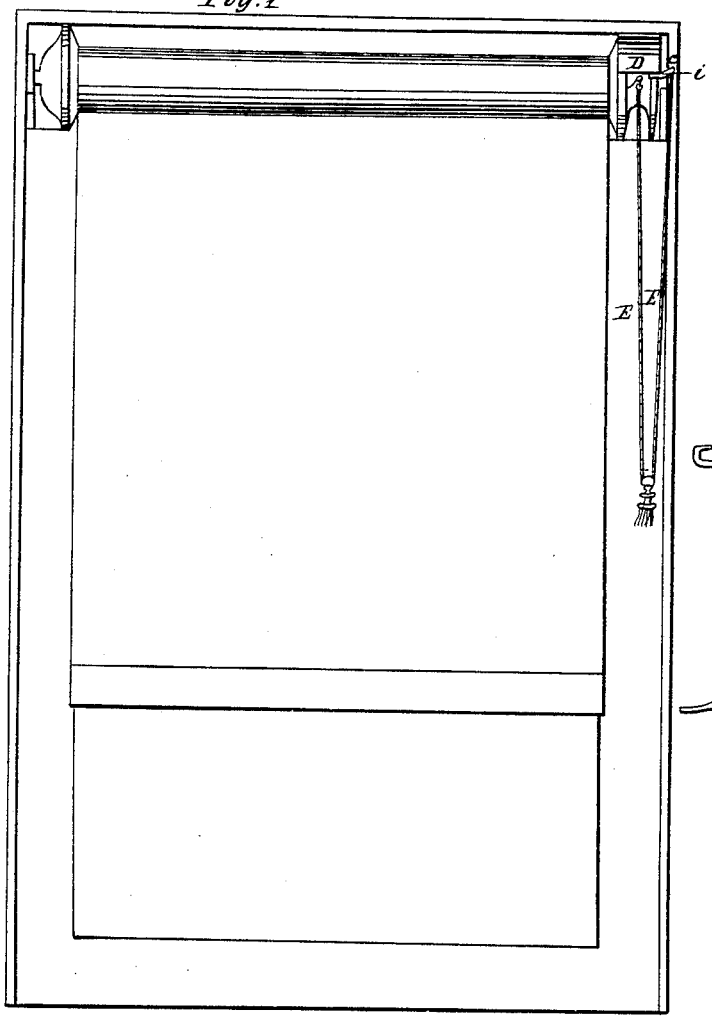
Figure 2:
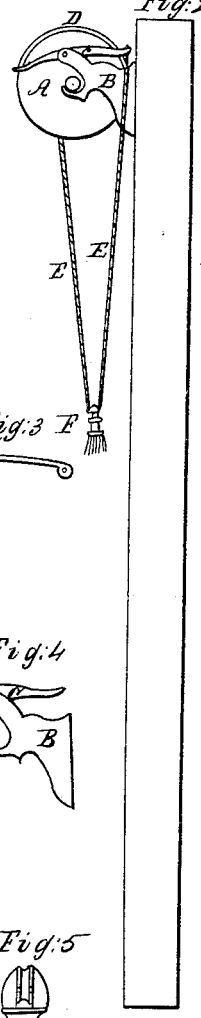
Figure 3:
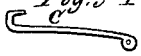
Figure 4:
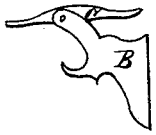
Figure 5:
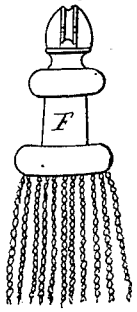
Figure 6:
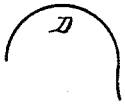

J. F. Hall.

Curtain Fixture,

No 254, A. I. Oct. 25, 1859.

Ow Pat 19560

Operation of lever C releases Spring Brake D

Witnesses

Chas. S. Crosby

L. B. Hasey

Inventor

Joseph F. Hall

N. PETERS, PHOTO-LITHOGRAPHER, WASHINGTON, D. C.